United States Patent [19]

Ishida et al.

[11] Patent Number: 5,560,983
[45] Date of Patent: Oct. 1, 1996

[54] MAGNETIC RECORDING MEDIUM COMPRISING A MAGNETIC LAYER AND A SUB LAYER CONTAINING AN UNSATURATED ALKYL CARBONIC ESTER

[75] Inventors: Toshio Ishida; Yasushi Endo; Tsutomu Okita, all of Kanagawa, Japan

[73] Assignee: Fuji Photo Film Co., Ltd., Kanagawa, Japan

[21] Appl. No.: 524,830

[22] Filed: Sep. 7, 1995

[30] Foreign Application Priority Data

Sep. 7, 1994 [JP] Japan ................ 6-238613

[51] Int. Cl.$^6$ ................ G11B 5/71
[52] U.S. Cl. ........ 428/216; 428/128; 428/336; 428/694 BM; 428/694 BS; 428/900
[58] Field of Search ............ 428/216, 328, 428/336, 694 BM, 694 BS, 900

[56] References Cited

U.S. PATENT DOCUMENTS

| | | | |
|---|---|---|---|
| 3,987,232 | 10/1976 | Huguenard et al. | 428/539 |
| 4,015,042 | 3/1977 | Chassaigne | 428/325 |
| 4,032,682 | 6/1977 | Masson | 428/309 |
| 5,026,577 | 6/1991 | Biresaw et al. | 428/1 |
| 5,075,167 | 12/1991 | Yamauchi et al. | 428/336 |

*Primary Examiner*—Stevan A. Resan
*Attorney, Agent, or Firm*—Sughrue, Mion, Zinn, Macpeak & Seas

[57] ABSTRACT

A magnetic recording medium is described, which comprises a nonmagnetic support having on at least one side thereof a lower layer and an upper layer, in which the upper layer is a magnetic layer mainly comprising ferromagnetic particles and a binder resin, and the lower layer is adjacent to the magnetic layer and is either a magnetic layer mainly comprising ferromagnetic particles and a binder resin or a nonmagnetic layer mainly comprising nonmagnetic particles and a binder resin, wherein the upper layer has a thickness of from 0.05 to less than 1.0 μm the lower layer has a thickness of from 1 to 5 μm and contains unsaturated alkyl carbonate having from 17 to 45 total carbon atoms represented by the following formula in an amount of from 1.8 to 100% by weight based on the amount of the binder resin:

$$R_1-O-\underset{\underset{O}{\|}}{C}-O-R_2$$

wherein $R_1$ and $R_2$ are the same or different and each represents a chain hydrocarbon group having from 8 to 22 carbon atoms, provided that at least one of $R_1$ and $R_2$ contains one or more unsaturated bonds; and 60 to 100% by weight of the ferromagnetic particles and nonmagnetic particles contained in the lower layer, in the case where the lower layer is a magnetic layer, has a specific surface area of from 1 to 150 m$^2$/g; or 60 to 100% by weight of the nonmagnetic particles contained in the lower layer, in the case where the lower layer is a nonmagnetic layer, has a specific surface area of from 1 to 150 m$^2$/g.

3 Claims, No Drawings

MAGNETIC RECORDING MEDIUM COMPRISING A MAGNETIC LAYER AND A SUB LAYER CONTAINING AN UNSATURATED ALKYL CARBONIC ESTER

FIELD OF THE INVENTION

The present invention relates to a magnetic recording medium. More particularly, the present invention relates to a magnetic recording medium having excellent running properties, durability, and storage stability.

BACKGROUND OF THE INVENTION

In the field of magnetic recording, the desire for higher recording densities is growing in recent years. With respect to coated-type magnetic recording media, various expedients have been proposed for reducing the particle size of ferromagnetic particles, improving the dispersibility thereof, and increasing the loading thereof in a magnetic layer. A more effective expedient presently in use is to employ ferromagnetic metal particles or a hexagonal ferrite which have excellent magnetic characteristics.

On the other hand, magnetic recording disks for use as external memory media have spread remarkably with the spread of minicomputers and personal computers in office appliances, and these magnetic recording disks have come to be used and stored under a wide range of temperature/humidity conditions and also come to be used in a dusty atmosphere. Consequently, it has become necessary to take such various use atmospheres into account in designing such magnetic recording media.

There also is a strong desire for an improvement in recording density in order to attain an increased recording capacity and miniaturization of recording devices. However, in the conventional technique of using acicular magnetic particles to obtain a recording medium suitable for high-density recording, the magnetic particles should be regulated so that the maximum size thereof is sufficiently smaller than the recording wavelength or the length of the recording bit. At present, acicular magnetic particles having a size of about 0.3 μm are already in practical use and, as a result, a minimum recording wavelength of about 1 μm or shorter has become possible.

A further size reduction in acicular magnetic particles is necessary for developing a medium capable of higher-density recording, but such size reduction is difficult because of the following problem. That is, if acicular magnetic particles each having an exceedingly small thickness not larger than 100 Å (angstrom) and hence an exceedingly small volume not larger than $10^{-1}cm^3$ are used in a magnetic coating film, these magnetic particles have reduced magnetic characteristics and are incapable of being sufficiently oriented by application of a magnetic field to the magnetic coating film due to surface properties such as thermal fluctuations.

Although the conventional investigations on ferromagnetic particles for coping with high-density recording have mainly been directed to ferromagnetic metal particles, a magnetic recording medium has been developed which employs as a ferromagnetic material a hexagonal ferrite which is of a platy particle shape and has an axis of easy magnetization in a direction perpendicular to the plate surface (e.g., JP-A-58-6525, JP-A-58-6526). (The term "JP-A" as used herein means an "unexamined published Japanese patent application.") These ferromagnetic particles of a hexagonal ferrite are advantageous in that the above-described problem is mitigated even when the average particle diameter thereof is 0.05 μm or smaller and, hence, the magnetic recording medium employing these ferromagnetic particles is capable of recording at a further heightened density.

On the other hand, investigations have been made on a great reduction in track pitch for a higher recording density. In the field of disk-form magnetic recording media also, use of particles of a ferromagnetic metal or hexagonal ferrite with which a higher output and a higher linear recording density are expected is being investigated in order to meet such desires. Thus, development and practical use of such ferromagnetic particles have been intensively investigated in order to meet the desire for a recording medium having a reduced size and an improved recording density. In particular, there is a desire for thickness reduction and output increase in magnetic layers from the standpoints of attaining a higher recording density and improving the electromagnetic characteristics necessary for overwriting. However, there is a fear that running durability may considerably deteriorate as a result of a thickness reduction.

Illustratively stated, when the thickness of a magnetic layer is reduced in order to improve overwriting properties, the amount of a lubricant which can be infiltrated into the magnetic layer becomes smaller accordingly. As a result, the lubricant is gradually removed to become insufficient due to sliding by a recording/reproduction head, and this may result in, for example, magnetic-layer abrasion, or sticking.

From the standpoint of improving magnetic characteristics, the surface of a magnetic layer should be smoothed more and more. Because of this, the conventionally known lubricants have been ineffective in fully improving running properties, suitability for running repetitions, and durability.

For example, JP-B-54-277723 discloses a technique of using carbonic ester as a lubricant to provide a magnetic recording medium having a long life and high resistance to abrasion and tear. (The term "JP-B" as used herein means an "examined Japanese patent publication.")

Besides the carbonic ester, the conventionally employed lubricants include mineral oils, silicone oils, higher fatty acids, fatty acid esters, animal oils such as beef tallow, whale oil and shark oil, and vegetable oils.

Use of the conventional lubricating oils shown above has had the following problem. If the lubricant is incorporated in a larger amount so as to enhance its lubricating effect, the magnetic coating film comes to have reduced mechanical strength. As a result, the magnetic layer abrades, and the resulting abrasion debris foul the passageway of the recording medium or make it impossible to obtain sufficient still reproduction durability. A known technique for improving still reproduction durability is to use a mixture of fatty acid ester such as butyl stearate and fatty acid such as myristic acid, as disclosed in, e.g., JP-B-28-28367 and JP-B-51-39081. However, the disclosed technique has caused a problem that when the magnetic tape produced using this technique is run under high-humidity conditions, it suffers increased friction and is hence under increased running tension.

Fatty acids, when used alone, are effective in improving image quality but should be used in a large amount in order to obtain lubricity. The incorporation of a large amount of fatty acid has been disadvantageous in that the magnetic layer becomes so soft that the mechanical strength and still reproduction durability thereof are impaired.

The technique of using fatty acid and fatty acid ester compound in combination as described in JP-B-51-39081 brings about satisfactory still durability and relatively reduced tension. However, the recording medium produced with this technique has had a drawback that this recording medium undergoes an increased running tension under high-humidity conditions, e.g., 85% RH (relative humidity).

Although a technique of incorporating an abrasive material (hard particles) into a magnetic layer was proposed as another expedient for improving running durability and has come into practical use, the abrasive material should be incorporated in a considerably large amount because its effect of improving the running durability of the magnetic layer is not easily produced. Namely, it is after all difficult to obtain satisfactory running durability without sacrificing electromagnetic characteristics or head-abrading properties.

In recent years, from the standpoint of obtaining magnetic recording media capable of high-density recording, not only ferromagnetic metal particles but also acicular magnetic particles have come to be incorporated as ferromagnetic particles in magnetic layers having an exceedingly smooth surface. However, such recording media have insufficient running durability.

On the other hand, JP-B-54-27723 discloses carbonic ester (carbonate) having a saturated alkyl group. Since this carbonic ester has a low viscosity for its high molecular weight, fluid lubrication is expected. The proposed carbonic ester also has an advantage of being less susceptible to hydrolysis.

However, the proposed carbonic ester has serious problems when used as a lubricant for coated-type magnetic recording media containing a binder resin. That is, since the carbonic ester is highly compatible with the binder resin, the ester is incapable of behaving in a free state on the magnetic layer and, hence, does not effectively function as a lubricant if merely incorporated in the magnetic layer. In addition, the high compatibility of the ester with the binder resin reduces the strength of the magnetic layer itself, resulting in impaired durability.

As described above, since the amount of a lubricant is limited for attaining a reduction in magnetic-layer thickness, a subject of investigation has been how to produce a lubricating effect.

SUMMARY OF THE INVENTION

An object of the present invention, which has been achieved in view of the problems of the above-described prior art techniques, is to provide a high-density magnetic recording medium which has an exceedingly smooth surface and retains sufficient running properties, suitability for running repetitions, and durability, and to provide a magnetic recording medium which has such high lubricity that it withstands not only use and storage in a wide range of atmospheres but also use in a dusty place.

This and other objects of the present invention have been accomplished with a magnetic recording medium comprising a nonmagnetic support having on at least one side thereof a lower layer and an upper layer, in which the upper layer is a magnetic layer mainly comprising ferromagnetic particles and a binder resin, and the lower layer is adjacent to the magnetic layer and is either a magnetic layer mainly comprising ferromagnetic particles and a binder resin or a nonmagnetic layer mainly comprising nonmagnetic particles and a binder resin, wherein the upper layer has a thickness of from 0.05 to less than 1.0 µm;

the lower layer has a thickness of from 1 to 5 µm and contains unsaturated alkyl carbonate having from 17 to 45 total carbon atoms represented by the following formula in an amount of from 1.8 to 100% by weight based on the amount of the binder resin:

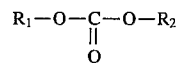

wherein $R_1$ and $R_2$ are the same or different and each represents a chain hydrocarbon group having from 8 to 22 carbon atoms, provided that at least one of $R_1$ and $R_2$ contains one or more unsaturated bonds; and 60 to 100% by weight of the ferromagnetic particles and nonmagnetic particles contained in the lower layer, in the case where the lower layer is a magnetic layer, has a specific surface area of from 1 to 150 m$^2$/g; or 60 to 100% by weight of the nonmagnetic particles contained in the lower layer, in the case where the lower layer is a nonmagnetic layer, has a specific surface area of from 1 to 150 m$^2$/g.

DETAILED DESCRIPTION OF THE INVENTION

According to the present invention, a technique of forming a protective layer which combines a high degree of storage stability, running properties, and durability is obtained unlike any prior art technique, thereby realizing a high-density magnetic recording medium. Since the unsaturated alkyl carbonate for use in the present invention (hereinafter referred to as "the compound of the present invention") contains an unsaturated bond incorporated therein and has a low viscosity for its molecular weight, it shows high fluid lubricity. Moreover, since the compound of the present invention does not have fatty acid ester bond but a carbonate bond, it is less susceptible to hydrolysis and hence has high storage stability. In a high-recording-density magnetic medium, the upper magnetic layer is required to have a reduced thickness for attaining satisfactory overwriting properties and, as a result, the amount of a lubricant which can be infiltrated into the upper magnetic layer is reduced. Hence, if the compound of the present invention, which is highly compatible with binders because it has an unsaturated group, is incorporated as a lubricant into the thin uppermost layer alone or thin single-layer magnetic layer alone, only a small portion of the lubricant migrates to the surface, with most of the lubricant remaining inside. As a result, the lubricant is gradually removed due to sliding by a recording/reproduction head during long-term running, and this results in sticking. This problem can be eliminated by incorporating the lubricant into the lower layer in an amount sufficient for making up for the lubricant shortage. Thus, the upper layer can be always compensated for lubricant shortage and hence retain a high degree of running durability. It should, however, be noted that if the lower layer contains a large proportion of nonmagnetic or ferromagnetic particles having a large specific surface area, the compound of the present invention does not migrate to the surface because of infiltration thereof into the nonmagnetic particles. This undesirable infiltration of the compound of the present invention into nonmagnetic or ferromagnetic particles can be greatly diminished by regulating the specific surface area of the particles to preferably from 1 to 150 m$^2$/g. Thus, it has become possible to cause the lubricant to migrate to the surface in a necessary amount to thereby impart a high degree of running durability to the magnetic layer.

The lower layer is preferably a nonmagnetic layer. The reasons for this are that the nonmagnetic layer as the lower layer enables the upper layer to be more easily smoothed and thinned, and that the lubricant used in a small amount can be effectively present on the surface because the compound of the present invention is less adsorbed onto the nonmagnetic particles than onto ferromagnetic particles and the nonmagnetic particles have a small specific surface area.

The compound of the present invention is incorporated at least into the lower layer. The amount of the compound of the present invention incorporated into the lower layer is from 1.8 to 100% by weight, preferably from 3.6 to 64.3% by weight, more preferably from 7.1 to 42.9% by weight, based on the amount of the binder resin contained in the lower layer.

The upper layer need not contain the compound of the present invention. It is however preferred to incorporate a lubricant such as the compound of the present invention also into the upper layer in an amount from ⅛ to 7 times, preferably from ½ to 3 times, the lubricant amount in the lower layer. The incorporation of the compound of the present invention into the upper layer has the effect of promoting the migration of the compound of the present invention from the lower layer to the surface; this effect is enhanced especially when the lubricant amount in the upper layer and that in the lower layer come close to each other.

In the present invention, the thickness of the upper layer is from 0.05 to less than 1.0 μm, preferably from 0.07 to 0.7 μm, and more preferably from 0.09 to 0.5 μm. If the thickness of the upper layer is less than 0.05 μm, the upper layer is so thin for the recording frequency that sufficient data recording is impossible. If the thickness thereof is 1.0 μm or more, the upper layer has diamagnetism, resulting in reduced output.

If the thickness of the lower layer is less than 1 μm, the amount of the lubricant fed to the magnetic layer as the upper layer becomes insufficient. Lower-layer thicknesses exceeding 5 μm are undesirable because such large thicknesses result in a cost increase.

In the case where the lower layer is a magnetic layer, the ferromagnetic particles and nonmagnetic particles to be incorporated thereinto are selected so that usually from 60 to 100% by weight, preferably from 90 to 100% by weight, of the ferromagnetic and nonmagnetic particles have a specific surface area of usually from 1 to 150 m²/g, preferably from 1 to 120 m²/g, and more preferably from 2 to 100 m²/g. These values of content (% by weight) are based on the total amount of all particles, i.e., the sum of the ferromagnetic particles and nonmagnetic particles. Examples of the nonmagnetic particles include abrasive materials and carbon blacks which will be described later. The amount of the ferromagnetic particles is usually from 60 to 100% by weight, preferably from 90 to 100% by weight, based on the total amount of all particles.

In the case where the lower layer is a nonmagnetic layer, the nonmagnetic particles to be incorporated thereinto are selected so that usually from 60 to 100% by weight, preferably from 90 to 100% by weight, of the nonmagnetic particles have a specific surface area of usually from 1 to 150 m²/g, preferably from 1 to 120 m²/g, and more preferably from 2 to 100 m²/g. These values of content (% by weight) are based on the total amount of all nonmagnetic particles. Examples of the nonmagnetic particles include nonmagnetic inorganic particles, abrasive materials, carbon blacks, etc. which will be described later. Usually from 70 to 100% by weight, preferably from 80 to 100% by weight, of the nonmagnetic particles are nonmagnetic inorganic particles.

In the compound of the present invention, $R_1$ and $R_2$ are the same or different and each represents a chain hydrocarbon group having from 8 to 22 carbon atoms, provided that at least either contains one or more unsaturated bonds. $R_1$ and $R_2$ each preferably contains from 12 to 22 carbon atoms, preferably from 12 to 18 carbon atoms. Consequently, the total number of the carbon atoms contained in the compound of the present invention is preferably from 25 to 45, more preferably from 25 to 37. If the total carbon number for the compound of the present invention is 16 or less, the compound is highly volatile and passes off from the surface of the magnetic layer during running to cause sticking. If the total carbon number is 46 or more, the lubricant molecule has reduced mobility and, hence, the lubricant does not migrate to the surface in a necessary amount, thereby causing sticking. The chain hydrocarbon groups may be either straight or branched, but $R_1$ and $R_2$ are each preferably a linear hydrocarbon group having at least one unsaturated bond. In this case, it is especially preferred that $R_1$ and $R_2$ have the same structure. The unsaturated bond may be either a double bond or a triple bond, but is preferably a double bond. The double bond may be either cis or trans.

Examples of the compound of the present invention are given below, but the compound should not be construed as being limited thereto.

Examples thereof include dodecenyl butyl carbonate (lauroleyl butyl carbonate), lauroleyl hexyl carbonate, lauroleyl octyl carbonate, lauroleyl decyl carbonate, lauroleyl lauryl carbonate, lauroleyl tridecyl carbonate, lauroleyl myristyl carbonate, lauroleyl hexadecyl carbonate, lauroleyl octadecyl carbonate, lauroleyl behenyl carbonate, lauroleyl eicosyl carbonate, lauroleyl amyl carbonate, lauroleyl isobutyl carbonate, lauroleyl isohexyl carbonate, lauroleyl isooctyl carbonate, lauroleyl isolauryl carbonate, lauroleyl isodecyl carbonate, lauroleyl isotridecyl carbonate, lauroleyl isotetradecyl carbonate, lauroleyl isohexadecyl carbonate, lauroleyl isooctadecyl carbonate, lauroleyl isoeicosyl carbonate, lauroleyl isoamyl carbonate, tetradecenyl butyl carbonate, (myristoleyl butyl carbonate), myristoleyl hexyl carbonate, myristoleyl octyl carbonate, myristoleyl decyl carbonate, myristoleyl lauryl carbonate, myristoleyl tridecyl carbonate, myristoleyl myristyl carbonate, myristoleyl hexadecyl carbonate, myristoleyl octadecyl carbonate, myristoleyl behenyl carbonate, myristoleyl eicosyl carbonate, myristoleyl amyl carbonate, myristoleyl isobutyl carbonate, myristoleyl isohexyl carbonate, myristoleyl isooctyl carbonate, myristoleyl isodecyl carbonate, myristoleyl isolauryl carbonate, myristoleyl isotridecyl carbonate, myristoleyl isotetradecyl carbonate, myristoleyl isohexadecyl carbonate, myristoleyl isooctadecyl carbonate, myristoleyl isoeicosyl carbonate, myristoleyl isoamyl carbonate, hexadecenyl butyl carbonate (palmitoleyl butyl carbonate), palmitoleyl hexyl carbonate, palmitoleyl octyl carbonate, palmitoleyl decyl carbonate, palmitoleyl lauryl carbonate, palmitoleyl tridecyl carbonate, palmitoleyl myristyl carbonate, palmitoleyl hexadecyl carbonate, palmitoleyl octadecyl carbonate, palmitoleyl behenyl carbonate, palmitoleyl eicosyl carbonate, palmitoleyl amyl carbonate, palmitoleyl isohexadecyl carbonate, hexadecenyl isobutyl carbonate (palmitoleyl isobutyl carbonate), palmitoleyl isohexyl carbonate, palmitoleyl isooctyl carbonate, palmitoleyl isodecyl carbonate, palmitoleyl isolauryl carbonate, palmitoleyl isotridecyl carbonate, palmitoleyl isotetradecyl carbonate, palmitoleyl isooctadecyl carbonate, palmitoleyl isoeicosyl carbonate, palmitoleyl isoamyl carbonate, octadecenyl butyl carbonate (oleyl butyl carbonate), oleyl hexyl carbonate, oleyl octyl carbonate, oleyl decyl carbonate, oleyl lauryl carbonate, oleyl tridecyl carbonate, oleyl myristyl carbonate, oleyl hexadecyl carbonate, oleyl octadecyl carbonate, oleyl behenyl carbonate, oleyl eicosyl carbonate, oleyl amyl carbonate, oleyl isohexadecyl carbonate, octadecenyl isobutyl carbonate (oleyl isobutyl carbonate), oleyl isohexyl carbonate, oleyl isooctyl carbonate, oleyl isodecyl carbonate, oleyl isolauryl carbonate, oleyl isotridecyl carbonate, oleyl isotetradecyl carbonate, oleyl isooctadecyl carbonate, oleyl isoeicosyl carbonate, oleyl isoamyl carbonate, eicosenyl butyl carbonate (gadoleyl butyl carbonate), gadoleyl hexyl carbonate, gadoleyl octyl carbonate, gadoleyl decyl carbonate, gardoleyl lauryl carbonate, gadoleyl tridecyl carbonate, gadoleyl myristyl carbonate, gadoleyl hexadecyl carbonate, gadoleyl octadecyl carbonate, gadoleyl behenyl carbonate, gadoleyl eicosyl carbonate, gadoleyl amyl carbonate, gadoleyl isohexadecyl carbonate, eicosenyl isobutyl carbonate (gadoleyl isobutyl carbonate), gadoleyl isohexyl carbonate, gadoleyl isooctyl carbonate, gadoleyl isodecyl carbonate, gadoleyl isolauryl carbonate, gadoleyl isotridecyl carbonate, gadoleyl isotetradecyl carbonate, gadoleyl isooctadecyl carbonate, gadoleyl isoeicosyl carbonate, gadoleyl isoamyl carbonate, erucyl butyl carbonate, erucyl hexyl carbonate, erucyl octyl carbonate, erucyl decyl carbonate, erucyl lauryl carbonate, erucyl tridecyl carbonate, erucyl myristyl carbonate, erucyl hexadecyl carbonate, erucyl octadecyl carbonate, erucyl behenyl carbonate, erucyl eicosyl carbonate, erucyl amyl carbonate, erucyl isohexadecyl carbonate, erucyl isobutyl carbonate, erucyl isohexyl carbonate, erucyl isooctyl carbonate, erucyl isodecyl carbonate, erucyl isolauryl carbonate, erucyl isotridecyl carbonate, erucyl isotetradecyl carbonate, erucyl isooctadecyl carbonate, erucyl isoeicosyl carbonate, erucyl isoamyl carbonate, linoleyl butyl carbonate, linoleyl hexyl carbonate, linoleyl octyl carbonate, linoleyl decyl carbonate, linoleyl lauryl carbonate, linoleyl tridecyl carbonate, linoleyl myristyl carbonate, linoleyl hexadecyl carbonate, linoleyl octadecyl carbonate, linoleyl behenyl carbonate, linoleyl eicosyl carbonate, linolyl amyl carbonate, linoleyl isohexadecyl carbonate, linoleyl isobutyl carbonate, linoleyl isohexyl carbonate, linoleyl isooctyl carbonate, linoleyl isodecyl carbonate, linoleyl isolauryl carbonate, linoleyl isotridecyl carbonate, linoleyl isotetradecyl carbonate, linoleyl isooctadecyl carbonate, linoleyl isoeicosyl carbonate, linoleyl isoamyl carbonate, linolenyl butyl carbonate, linolenyl hexyl carbonate, linolenyl octyl carbonate, linolenyl decyl carbonate, linolenyl lauryl carbonate, linolenyl tridecyl carbonate, linolenyl myristyl carbonate, linolenyl hexadecyl carbonate, linolenyl octadecyl carbonate, linolenyl behenyl carbonate, linolenyl eicosyl carbonate, linolenyl amyl carbonate, linolenyl isohexadecyl carbonate, linolenyl isobutyl carbonate, linolenyl isohexyl carbonate, linolenyl isooctyl carbonate, linolenyl isodecyl carbonate, linolenyl isolauryl carbonate, linolenyl isotridecyl carbonate, linolenyl isotetradecyl carbonate, linolenyl isooctadecyl carbonate, linolenyl isoeicosyl carbonate, and linolenyl isoamyl carbonate.

Preferred examples thereof include lauroleyl myristoleyl carbonate, lauroleyl palmitoleyl carbonate, lauroleyl oleyl carbonate, lauroleyl gadoleyl carbonate, lauroleyl erucyl carbonate, lauroleyl linoleyl carbonate, lauroleyl linolenyl carbonate, lauroleyl eleostearyl carbonate, lauroleyl arachidonyl carbonate, lauroleyl clupanodonyl carbonate, lauroleyl myristoleyl carbonate, myristoleyl oleyl carbonate, myristoleyl palmitoleyl carbonate, myristoleyl gadoleyl carbonate, myristoleyl erucyl carbonate, myristoleyl linoleyl carbonate, myristoleyl linolenyl carbonate, myristoleyl eleostearyl carbonate, myristoleyl arachidonyl carbonate, myristoleyl clupanodonyl carbonate, palmitoleyl oleyl carbonate, palmitoleyl gadoleyl carbonate, palmitoleyl erucyl carbonate, palmitoleyl linoleyl carbonate, palmitoleyl linolenyl carbonate, palmitoleyl eleostearyl carbonate, palmitoleyl arachidonyl carbonate, palmitoleyl clupanodonyl carbonate, oleyl gadoleyl carbonate, oleyl erucyl carbonate, oleyl arachidonyl carbonate, oleyl clupanodonyl carbonate, elaidyl myristoleyl carbonate, elaidyl palmitoleyl carbonate, elaidyl gadoleyl carbonate, elaidyl erucyl carbonate, elaidyl arachidonyl carbonate, elaidyl clupanodonyl carbonate, elaidyl myristoleyl carbonate, gadoleyl erucyl carbonate, gadoleyl linoleyl carbonate, gadoleyl linolenyl carbonate, gadoleyl eleostearyl carbonate, gadoleyl arachidonyl carbonate, gadoleyl clupanodonyl carbonate, erucyl linoleyl carbonate, linoleyl arachidonyl carbonate, linoleyl clupanodonyl carbonate, eleostearyl arachidonyl carbonate, eleostearyl clupanodonyl carbonate, arachidonyl clupanodonyl carbonate, didodecenyl carbonate (dilauroleyl carbonate), ditetradecenyl carbonate (dimyristoleyl carbonate), dihexadecenyl carbonate (dipalmitoleyl carbonate), diarachidonyl carbonate (diclupanodonyl carbonate, dieicosenyl carbonate (digadoleyl carbonate), and dierucyl carbonate.

Especially preferred examples thereof include oleyl linoleyl carbonate, oleyl linolenyl carbonate, oleyl eleostearyl carbonate, elaidyl oleyl carbonate, elaidyl linoleyl carbonate, elaidyl linolenyl carbonate, elaidyl eleostearyl carbonate, linoleyl linolenyl carbonate, linoleyl eleostearyl carbonate, linolenyl eleostearyl carbonate, dioctadecenyl carbonate (diolelyl carbonate, dielaidyl carbonate), dioctadecenyl carbonate (dilinoleyl carbonate), and dioctadecadienyl carbonate (dilinolenyl carbonate, dieleostearyl carbonate).

The ferromagnetic particles for use in the magnetic layer of the magnetic recording medium of the present invention are not particularly limited and, for example, ferromagnetic metal particles or platy particles of a hexagonal ferrite may be used.

In the case where the ferromagnetic particles are ferromagnetic metal particles, the particle size thereof is preferably such that the specific surface area thereof is from 30 to 80 m$^2$/g and the crystallite size thereof as determined by X-ray diffractometry is from 80 to 300 Å. Too small specific surface areas thereof are undesirable in that such particles are unsuitable for sufficiently coping with high-density recording. Too large specific surface areas thereof are undesirable in that since such particles cannot be sufficiently dispersed, a magnetic layer having a smooth surface cannot be formed, also making it impossible to cope with high-density recording. In the case of using platy particles of a hexagonal ferrite, these particles have a specific surface area of from 25 to 70 m$^2$/g, an aspect ratio of from 2 to 15, and a particle length of from 0.02 to 1.0 µm.

Too large or too small ferrite particle sizes are undesirable, because such ferrite particles make high-density recording difficult as in the case of the ferromagnetic metal particles.

The ferromagnetic metal particles preferably contain at least Fe. Examples of the material of these metal particles include elemental metals or alloys each consisting mainly of Fe, Fe—Co, Fe—Ni, or Fe—Ni—Co. In order for the magnetic recording medium of this invention to be capable of high-density recording, the ferromagnetic metal particles are required to have satisfactory magnetic characteristics in addition to the small particle size described above. Specifically, the ferromagnetic metal particles have a saturation magnetization of 110 emu/g or more, preferably 120 emu/g or more and a coercive force of usually 800 Oe (oersted) or more, preferably from 900 to 1,200 Oe. The aspect ratio (major axis length/minor axis length) thereof is usually 3 or more, preferably from 5 to 15.

For the purpose of improving properties, a non-metal, e.g., B, C, Al, Si, or P, may be added to the material constituting the ferromagnetic metal particles The surface of the metal particles is usually covered with an oxide layer for imparting chemical stability.

The platy hexagonal ferrite is a ferromagnetic material consisting of platy particles having an axis of easy magnetization in a direction perpendicular to the plate surface. Examples thereof include barium ferrite, strontium ferrite, lead ferrite, calcium ferrite, and cobalt-substituted products thereof. Especially preferred of these are the cobalt-substituted product of barium ferrite and the cobalt-substituted product of strontium ferrite. If desired and necessary, an element, such as In, Zn, Ge, Nb, or V, may be added thereto for property improvement.

For the magnetic recording medium of the present invention to be capable of high-density recording, the platy hexagonal ferrite particles are required to have satisfactory magnetic characteristics in addition to the small particle size described hereinabove. Specifically, the ferrite particles have a saturation magnetization of 50 emu/g or more, preferably 53 emu/g or more and a coercive force of 500 Oe or more, preferably from 600 to 2,200 Oe.

These particulate ferromagnetic materials are preferably regulated to have an optimal water content of from 0.01 to 2% by weight and an optimal pH of from 4 to 12, preferably from 5 to 10, according to the kind of the binder used in combination therewith.

The layers constituting the recording medium of the present invention may contain nonmagnetic conductive particles. In particular, use of carbon black is preferable for the prevention of static build-up. For this purpose, the carbon black preferably has a specific surface area of from 5 to 500 $m^2/g$, a DBP absorption of from 10 to 1,500 ml/100 g, a particle diameter of from 5 to 300 mμ, a pH of from 2 to 10, a water content of from 0.1 to 10%, and a tap density of from 0.1 to 1 g/cc. Specific examples of the carbon black usable in the present invention include BLACKPEARLS 2000, 1300, 1000, 900, 800, 700, and VULCAN XC-72 manufactured by Cabot Co., Ltd.; #80, #60, #55, #50, and #35 manufactured by Asahi Carbon Co., Ltd.; #3950B, #2400B, #2300, #900, #1000, #30, #40, and #10B manufactured by Mitsubishi Kasei Corp.; CONDUCTEX SC, RAVEN 150, 50, 40, and 15 manufactured by Columbian Carbon Co., Ltd.; and Ketjen Black EC, Ketjen Black ECDJ-500, and Ketjen Black ECDJ-600 manufactured by Lion Akzo Co., Ltd. The carbon black may be surface-treated with a dispersant or other agent or grafted with a resin before use. The surface of the carbon black may be partly graphitized before use. Further, before being added to a magnetic coating fluid, the carbon black may be dispersed into a binder. In the case of using the carbon black in the upper layer, the amount thereof is preferably from 0.1 to 30% by weight based on the ferromagnetic particles. The amount of the carbon black incorporated in the lower layer is preferably from 3 to 20% by weight based on the amount of all nonmagnetic particles. The carbon black incorporated in the upper or lower layer functions to prevent static build-up in the layer, to reduce the coefficient of friction of the layer, as a light screen for the layer, and to improve the strength of the layer. Such effects are produced in different degrees depending on the kind of carbon black used. Therefore it is, of course, possible in the present invention to properly use different carbon blacks in different combinations and amounts according to the purpose on the basis of the above-described properties including particle size, oil absorption, electrical conductivity, and pH. Examples of the carbon black usable in the present invention are described in, for example, *Carbon Black Handbook*, edited by Carbon Black Association.

Of the nonmagnetic particles for use in the nonmagnetic layer of the present invention, examples of nonmagnetic inorganic particles include α-alumina having an α-alumina structure content of 90% or more, β-alumina, γ-alumina, silicon carbide, chromium oxide, cerium oxide, α-iron oxide, corundum, silicon nitride, titanium carbide, titanium oxide, silicon dioxide, boron nitride, zinc oxide, calcium carbonate, calcium sulfate, and barium sulfate. These nonmagnetic inorganic materials may be used alone or in combination thereof. These nonmagnetic particulate materials preferably have a particle size of from 0.01 to 2 μm. If desired and necessary, nonmagnetic particulate materials having different particle sizes may be used in combination, or a single nonmagnetic particulate material having a widened particle diameter distribution may be used so as to produce the same effect. These nonmagnetic particulate materials preferably have a tap density of from 0.3 to 2 g/cc, a water content of from 0.1 to 5%, a pH of from 2 to 11, and a specific surface area of from 1 to 30 $m^2/g$. The nonmagnetic inorganic particles for use in the present invention may have any particle shape selected from the acicular, spherical, and cubical forms. Specific examples of the nonmagnetic inorganic particles for use in the present invention include AKP-20, AKP-30, AKP-50, and HIT-50 manufactured by Sumitomo Chemical Company, Limited; G5, G7, and S-1 manufactured by The Nippon Chemical Industrial Co., Ltd.; TF-100, TF-120, and TF-140 manufactured by Toda Kogyo Co., Ltd.; TT055 series and ET300W manufactured by Ishihara Sangyo Kaisha, Ltd.; and STT30 manufactured by Titan Kogyo Co., Ltd.

Examples of abrasive materials for use in the present invention include generally employed abrasive materials such as fused alumina, silicon carbide, chromium oxide ($Cr_2O_3$), corundum, artificial corundum, diamond, artificial diamond, garnet, and emery (main components; corundum and magnetite). These abrasive materials have a Mohs' hardness of from 5 to 10, and are effective when having an average particle diameter of from 0.05 to 5 μm, preferably from 0.2 to 1.0 μm. These abrasive materials are incorporated in an amount of from 3 to 20 parts by weight per 100 parts by weight of the binder resin. If the amount thereof is less than 3 parts by weight, sufficient durability is not obtained. If the amount thereof is more than 20 parts by weight, a reduced loading results and, hence, sufficient output is not obtained.

It is, of course, possible to properly use these abrasive materials while changing the kinds, amounts, and combination of the nonmagnetic particles contained in the nonmagnetic layer and the abrasive material contained in the magnetic layer. For example, the durability of the upper-layer surface can be improved by increasing the amount of the abrasive material incorporated into the lower layer, while the durability of the edges of the upper layer can be improved by increasing the amount of the abrasive material incorporated into the upper layer. These abrasive materials may be dispersed in a binder before being added to a magnetic coating fluid.

The thickness of each constituent layer in the magnetic recording medium of the present invention is as follows. The thickness of the nonmagnetic support is from 1 to 100 μm, preferably from 20 to 85 μm, and that of the lower layer is from 1 to 5 μm, preferably from 2 to 4 μm. The thickness of the upper layer is from 0.05 to less than 1.0 µm, preferably from 0.1 to 0.7 µm. An undercoat layer may be formed between the nonmagnetic support and the lower layer for the purpose of improving adhesion. The thickness of this undercoat layer is from 0.01 to 2 µm, preferably from 0.05 to 0.5 µm. A back coat layer may also be formed on the other side of the nonmagnetic support. The thickness of this back coat layer is from 0.1 to 2 µm, preferably from 0.3 to 1.0 µm. The undercoat layer and the back coat layer may be the same as known ones. In the case of a disk-form magnetic recording medium, the constituent layers described above may be formed on either or both sides thereof.

The binder for use in the present invention may be a conventionally known thermoplastic resin, thermosetting resin, or reactive resin or a mixture thereof. The thermoplastic resin may be one having a glass transition temperature of from $-100°$ to $150°$ C., a number-average molecular weight of from 1,000 to 200,000, preferably from 10,000 to 100,000, and a degree of polymerization of about from 50 to 1,000. Examples of such thermoplastic resins include polymers or copolymers containing structural units derived from vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal, or vinyl ether, polyurethane resins, and various rubber-type resins.

Examples of the thermosetting or reactive resin include phenolic resins, epoxy resins, polyurethane thermosetting resins, urea resins, melamine resins, alkyd resins, acrylic reactive resins, formaldehyde resins, silicone resins, epoxypolyamide resins, mixtures of polyester resin and isocyanate prepolymer, mixtures of polyester polyol and polyisocyanate, and mixtures of polyurethane and polyisocyanate.

These resins are described in detail in *Plastic Handbook* published by Asakura Shoten. It is also possible to use a known resin of the electron beam-curing type for the lower layer or the upper layer. Examples of such resins and production processes therefor are described in detail in JP-A-62-256219. The above-enumerated resins can be used alone or in combination. Preferred examples of those include combinations of a polyurethane resin with at least one member selected from vinyl chloride resins, vinyl chloride-vinyl acetate resins, vinyl chloride-vinyl acetate-vinyl alcohol resins, vinyl chloride-vinyl acetate-maleic anhydride copolymers, and nitrocellulose, and further include combinations of these with a polyisocyanate.

The polyurethane resins may have a known structure such as polyester polyurethane, polyether polyurethane, polyether polyester polyurethane, a polycarbonate polyurethane, polyester polycarbonate polyurethane, or a polycaprolactone polyurethane. For obtaining further improved dispersibility and durability, it is desirable to use, according to need, one or more of the above-enumerated binders which have, incorporated therein through copolymerization or addition reaction, at least one polar group selected from —COOM, —SO$_3$M, —OSO$_3$M, —P=O(OM)$_2$, —O—P=O(OM)$_2$ (wherein M represents a hydrogen atom or an alkali metal salt group), —OH, —NR$_2$, —N$^+$R$_3$ (wherein R represents a hydrocarbon group), an epoxy group, —SH and —CN. The amount of such polar group(s) is from $10^{-1}$ to $10^{-8}$ mol/g, preferably from $10^{-2}$ to $10^{-6}$ mol/g.

Specific examples of those binders that can be used in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corp.; MPR-TA, MPR-TA5, MPR-TAL, MPR-TSN, MPR-TMF, MPR-TS, and MPR-TM manufactured by Nisshin Chemical Ind., Co., Ltd.; 1000W, DX80, DX81, DX82, and DX83 manufactured by Denki Kagaku Kogyo K.K.; MR110, MR100, and 400X 110A manufactured by Nippon Zeon Co., Ltd.; Nipporan N2301, N2302, and N2304 manufactured by Nippon Polyurethane Co. Ltd.; Pandex T-5105, T-R3080, T-5201, Burnock D-400, D-210-80, Krisvon 6109, and 7209 manufactured by Dainippon Ink & Chemicals, Inc.; Byron UR8200, UR8300, RV530, and RV280 manufactured by Toyobo Co., Ltd.; Daiferamine 4020, 5020, 5100, 5300, 9020, 9022, and 7020 manufactured by Dainichiseika Color & Chemicals Mfg. Co., Ltd.; MX5004 manufactured by Mitsubishi Kasei Corp.; Sunprene SP-150 manufactured by Sanyo Chemical Industries, Ltd.; and Saran F310 and F210 manufactured by Asahi Chemical Industry Co., Ltd.

The amount of the binder used in each layer in the present invention is from 5 to 50% by weight, preferably from 10 to 30% by weight, based on the amount of the ferromagnetic particles and the nonmagnetic particles. If a vinyl chloride resin, a polyurethane resin and a polysocyanate resin are used in combination, they are preferably used in an amount of from 5 to 100%, from 2 to 50% and from 2 to 100% by weight, respectively, based on the total amount of the binders.

In the case of using polyurethane in the present invention, this resin preferably has a glass transition temperature of from $-50°$ to $100°$ C., an elongation at break of from 100 to 2,000%, a stress at break of from 0.05 to 10 kg/cm$^2$, and a yield point of from 0.05 to 10 kg/cm$^2$.

The magnetic recording medium of the present invention has a multilayer structure. It is, of course, possible to form the individual layers so that these layers differ from each other in binder amount, the proportion of a vinyl chloride resin, polyurethane resin, polyisocyanate, or another resin in the binder, the molecular weight of each resin contained in the magnetic layer, polar group amount, or the aforementioned physical properties of resin according to need.

Examples of the polyisocyanate for use in the present invention include isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate, products of the reactions of these isocyanates with polyalcohols, and polyisocyanates formed by the condensation of isocyanates. These isocyanates are commercially available under the trade names of: Colonate L, Colonate HL, Colonate 2030, Colonate 2031, Millionate MR, and Millionate MTL manufactured by Nippon Polyurethane Co., Ltd.; Takenate D-102, Takenate D-110N, Takenate D-200, and Takenate D-202 manufactured by Takeda Chemical Industries, Ltd.; and Desmodule L, Desmodule IL, Desmodule N, and Desmodule HL manufactured by Sumitomo Bayer Co., Ltd. For each of the nonmagnetic layer and the magnetic layer, these polyisocyanates may be used alone or may be used in combination of two or more thereof to take advantage of a difference in curing reactivity.

Examples of dispersants (pigment-wetting agents) that can be used in this invention include fatty acids having from 12 to 18 carbon atoms (R$_1$COOH, wherein R$_1$ represents an alkyl or alkenyl group having from 11 to 17 carbon atoms), such as caprylic acid, capric acid, lauric acid, myristic acid, palmitic acid, stearic acid, behenic acid, oleic acid, elaidic acid, linoleic acid, linolenic acid, and stearolic acid; metallic soaps consisting of the above-enumerated fatty acids and an alkali metal (e.g., Li, Na, K) or an alkaline earth metal (e.g., Mg, Ca, Ba); fluorinated esters of the above-enumerated fatty acids; amides of the above-enumerated fatty acids; alkylphosphoric esters of poly(alkylene oxide)s; lecithins; and trialkyl polyolefinoxy quaternary ammonium salts (the alkyls each having from 1 to 5 carbon atoms and the olefin being, e.g., ethylene, propylene). In addition to these besides, higher alcohols having 12 or more carbon atoms, or sulfuric esters thereof may be used. These dispersants may be added in an amount of from 0.5 to 20 parts by weight per 100 parts by weight of the binder resin.

Besides the fatty acid esters enumerated hereinabove, the following compounds are also usable as a lubricant. Examples of such lubricant compounds include fatty acids, fatty acid esters other than the aforementioned ones, silicone oils, graphite, molybdenum disulfide, boron nitride, fluorinated graphite, fluorinated alcohols, polyolefins, polyglycols, alkylphosphoric esters, and tungsten disulfide.

Part or all of the additives to be used in the present invention may be added at any step in a coating fluid preparation process. For example, it is possible: to mix the additives with ferromagnetic particles prior to a kneading step; to add the additives during the kneading of ferromagnetic particles, a binder, and a solvent; to add the additives at a dispersing step; to add the additives after dispersion; or to add the additives immediately before coating.

The nonmagnetic support for use in the present invention is not particularly limited, and an ordinarily used one may be employed. Examples of the material of the nonmagnetic support include films or various synthetic resins (e.g., polyethylene terephthalate, polyethylene, polypropylene, polycarbonates, polyethylene naphthalate, polyamids, polyamideimides, polyimides, polysulfones, polyethersulfones, syndiotactic polystyrene), and metal foils (e.g., aluminum foil, stainless-steel foil). The nonmagnetic support generally has a thickness of from 1 to 100 μm, preferably from 25 to 85 μm.

Examples of organic solvents for use in the present invention include ketones (e.g., acetone, methyl ethyl ketone, methyl isobutyl ketone, diisobutyl ketone, cyclohexanone, isophorone, tetrahydrofuran); alcohols (e.g., methanol, ethanol, propanol, butanol, isobutyl alcohol, isopropyl alcohol, methylcyclohexanol); esters (e.g., methyl acetate, butyl acetate, isobutyl acetate, isopropyl acetate, ethyl lactate, glycol acetate); glycol ethers (e.g., glycol dimethyl ethers, glycol monoethyl ethers, dioxane); aromatic hydrocarbons (e.g., benzene, toluene, xylene, cresol, chlorobenzene); chlorinated hydrocarbons (e.g., methylene chloride, ethylene chloride, carbon tetrachloride, chloroform, ethylene chlorohydrin, dichlorobenzene); and other compounds (e.g., N,N-dimethylformamide, hexane). These solvents may be used in arbitrary proportions. These organic solvents need not be 100% pure, and may contain impurities such as isomers, unreacted raw materials, by-products, decomposition products, oxidation products, and water, besides the main components. The content of these impurities is preferably 30% by weight or less, more preferably 10% by weight or less. If desired and necessary, different organic solvents may be used in different amounts for forming an upper layer and a lower layer in the present invention. For example, it is possible to use a highly volatile solvent to form an upper layer having improved surface properties, to use a solvent with a high surface tension (e.g., cyclohexane, dioxane) to improve the stability of the coating for forming a lower layer, or to use a solvent with a high solubility parameter to increase loading. However, methods of using organic solvents are, of course, not limited to these examples.

The magnetic recording medium of the present invention is obtained by a process comprising kneading the above-described ferromagnetic particles and binder resin together with an organic solvent if necessary further with other optional additives, applying at least the resulting magnetic coating fluid on a nonmagnetic support, and drying the coating. Prior to the drying step, the ferromagnetic particles may be oriented if desired and necessary.

The process for preparing a magnetic coating fluid to be used for producing the magnetic recording medium of the present invention comprises at least a kneading step and a dispersing step, and may further comprise a mixing step that may be conducted, if needed, before and after the two steps. Each step may include two or more stages. Each of the materials for use in the present invention, including the ferromagnetic particles, binder, carbon black, abrasive material, antistatic agent, lubricant, and solvent, may be added in any step either at the beginning of or during the step. Further, the individual raw materials may be added portion-wise in two or more steps. For example, a polyurethane may be added portion-wise in each of the kneading step, the dispersing step, and the mixing step for viscosity adjustment after the dispersion.

For kneading and dispersion for preparing a magnetic coating fluid, any of various kneading machines may be used. Examples thereof include a two-roll mill, a three-roll mill, a ball mill, a pebble mill, a tron mill, a sand grinder, a Szegvari, an attritor, a high-speed impeller dispersing machine, a high-speed stone mill, a high-speed impact mill, a disper, a kneader, a high-speed mixer, a homogenizer, and an ultrasonic dispersing machine.

The nonmagnetic coating fluid for use in the present invention may be produced in substantially the same manner as for producing the magnetic coating fluid described above.

Conventionally known manufacturing techniques can, of course, be used as part of the process to attain the object of the present invention. However, the magnetic recording medium of the present invention can have a high $B_r$ only when a kneading machine having high kneading power, such as a continuous kneader or pressure kneader, is used in the kneading step. In the case of using a continuous kneader or pressure kneader, the ferromagnetic particles are kneaded together with all or part (preferably at least 30% by weight) of the binder, the binder amount being in the range of from 15 to 500 parts by weight per 100 parts by weight of the ferromagnetic particles. Details of this kneading treatment are given in JP-A-1-106338 and JP-A-1-79274. The magnetic recording medium of the present invention can be efficiently produced by employing a technique of simultaneous multiple coating such as that shown in JP-A-62-212933.

For calendering, plastic rolls having heat resistance may be used, such as epoxy, polyimide, polyamide, or polyimide-amide rolls. Metal rolls alone can also be used to conduct calendering. The calendering temperature is preferably 70° C. or more, more preferably 80° C. or more. The linear pressure is preferably 200 kg/cm or more, more preferably 300 kg/cm or more.

The residual solvent content in the upper layer in the magnetic recording medium of the present invention is preferably 100 mg/m$^2$ or less, more preferably 10 mg/m$^2$ or less. It is preferred that the residual solvent content in the upper layer be lower than that in the lower layer.

The void content in the lower layer and that in the upper layer are each preferably 30% by volume or less, preferably 10% by volume or less. The lower layer preferably has a higher void content than the upper layer, but may have a lower void content as long as its void content is 5% or higher.

The magnetic recording medium of the present invention, which has a lower layer and an upper layer, can be made to have a difference in physical property between the upper layer and the lower layer according to purpose, as can be easily presumed. For example, the upper layer is made to have a heightened modulus to improve running durability and, at the same time, the lower layer is made to have a lower modulus than the upper layer to improve the head touching of the magnetic recording medium.

A composition for forming an upper layer and a composition for forming a lower layer each is dispersed along with a solvent. The coating fluids thus obtained are applied to a nonmagnetic support, and orientation and drying are conducted to form a magnetic layer on the nonmagnetic support. A surface-smoothing treatment may be performed if desired. The resulting structure may be cut into a desired shape. Thus, the magnetic recording medium of the present invention is produced.

The magnetic recording medium of the present invention may be used as a floppy disk or magnetic disk for data recording or used for the analog recording of image information. The recording medium of this invention is particularly effective when used as a data-recording disk medium in which the occurrence of signal dropouts should be avoided by all means.

The present invention will be explained below in more detail by reference to the following examples, but it should be understood that the present invention is not to be construed as being limited thereto. Hereinafter all parts are by weight unless otherwise indicated.

EXAMPLES

Evaluation Methods

Measurement of Reproduced Output

Signals were recorded with disk tester Type SK606B, manufactured by Tokyo Engineering Co., Ltd., on each floppy disk in its position corresponding to a radius of 24.6 mm using a metal-in gap head having a gap length of 0.45 μm at a recording frequency of 625 kHz. The recorded signals were then reproduced with a head amplifier, and the output of the reproduced signals was measured with oscilloscope Type 7633, manufactured by Techtronics Co., Ltd.

Each reproduced output measured is shown as a relative value, with the output for Sample 1 being taken as 100.

Running Durability

Using floppy disk drive Type FD1331, manufactured by NEC Corporation, signals were recorded on each floppy disk throughout all the 240 tracks at a recording frequency of 625 kHz. The floppy disk was then subjected, in its position corresponding to a radius of 37.25 mm from the center, to a thermal cycle test in which each cycle consisted of steps (1) to (8) shown below.

Under such thermal cycling conditions, the floppy disk was run for a maximum of $1.8 \times 10^7$ passes. Thus, the running durability was evaluated in terms of the number of passes counted before the occurrence of sticking.

(Thermal Cycle)

(1) 25° C., 50% RH for 1 hour→(2) heating over 2 hours→(3) 60° C., 20% RH for 7 hours→(4) cooling over 2 hours→(5) 25° C., 50% RH for 1 hour→(6) cooling over 2 hours→(7) 5° C., 50% RH for 7 hours→(8) heating over 2 hours→(1)

Liner Wear Evaluation

Each sample was run for $2.4 \times 10^7$ passes in the same atmosphere as for the running durability evaluation, except that the head was kept off the magnetic disk. Thereafter, the cartridge was opened and the surface of the magnetic layer of the magnetic disk was visually examined to evaluate the liner wear.

○: the magnetic layer surface had no defects.

Δ: the magnetic layer surface had partly developed fine mars.

×: the magnetic layer surface had entirely developed fine mars.

××: the magnetic layer surface had entirely developed a large number of fine mars (clearly inferior to ×).

Example 1 (Samples 1 to 56)

| LOWER LAYER (Nonmagnetic Layer) | |
|---|---|
| Nonmagnetic particles; TiO$_2$ (TY50, manufactured by Ishihara Sangyo Kaisha, Ltd.; average particle diameter, 0.34 μm; BET specific surface area, 5.9 m$^2$/g; pH, 5.9) | 90 parts |
| Carbon black (Ketjen Black EC, manufactured by Lion Akzo Co., Ltd.; average particle diameter, 30 mμ; DBP absorption, 350 ml/100 g; BET specific surface area, 950 m$^2$/g) | 10 parts |
| Vinyl chloride-vinyl acetate-vinyl alcohol copolymer (containing $5 \times 10^{-6}$ eq/g of —N(CH$_3$)$_3^+$Cl$^-$ as a polar group; comonomer proportion, 86/13/1; degree of polymerization, 400) | 13 parts |
| Polyester polyurethane resin (neopentyl glycol/caprolactonepolyol/MDI = 0.9/2.6/1; containing $1 \times 10^{-4}$ eq/g —SO$_3$Na group) | 5 parts |
| Lubricant shown in Table 1 or 2 | amount shown in Table 1 or 2 |
| Oleic acid | 5 parts |
| Stearic acid | 2 parts |
| Methyl ethyl ketone | 200 parts |
| UPPER LAYER (Magnetic Layer) | |
| Ferromagnetic metal particles (composition, Fe/Ni = 96/4; H$_c$, 1,600 Oe; specific surface area, 58 m$^2$/g; crystallite size, 195 Å; σ$_s$; 130 emu/g; particle size (major axis length), 0.20 μm; aspect ratio, 10) | 100 parts |
| Vinyl chloride copolymer (—SO$_3$Na content, $1 \times 10^{-4}$ eq/g) | 13 parts |
| Polyester polyurethane resin (neopentyl glycol/caprolactonepolyol/MDI = 0.9/2.6/1; containing $1 \times 10^{-4}$ eq/g —SO$_3$Na group) | 5 parts |
| α-Alumina (particle size, 0.3 μm) | 2 parts |
| Carbon black (average particle size, 0.10 μm) | 0.5 parts |
| Lubricant shown in Table 1 | amount shown in Table 1 |
| Stearic acid | 5 parts |
| Oleic acid | 2 parts |
| Methyl ethyl ketone | 200 parts |

With respect to each of the two coating fluids described above, the ingredients were kneaded with a continuous kneader and then dispersed with a sand mill. To the resulting dispersions was added polyisocyanate in an amount of 10 parts for the lower-layer-forming coating fluid and in an amount of 10 parts for the upper-layer-forming coating fluid. To each dispersion was then added 40 parts of butyl acetate. Thereafter, the dispersions were filtered through a filter having an average opening diameter of 1 μm to prepare a coating fluid for forming a nonmagnetic layer and a coating fluid for forming a magnetic layer.

The nonmagnetic-layer-forming coating fluid and magnetic-layer-forming coating fluid thus obtained were applied by simultaneous double coating on a polyethylene terephthalate support having a thickness of 62 μm and a center line average surface roughness of 0.01 μm as follows. The nonmagnetic coating fluid was applied first at the dry thickness shown in Table 1, and the magnetic coating fluid was applied immediately thereafter in such an amount as to give a 0.45 μm-thick magnetic layer as the upper layer. While the two layers were in a wet state, random orientation was performed by passing the coated support through two alternating-current magnetic-field generators, one of which had a frequency of 50 Hz and an intensity of magnetic field of 200 G and the other of which had a frequency of 50 Hz and an intensity of magnetic field of 120 G. The coating was dried and then calendered with a 7-roll calender at a temperature of 90° C. and a linear pressure of 300 kg/cm. Thereafter, a 3.5-inch disk was punched from the resulting magnetic recording medium, subjected to a surface-polishing treatment, and then placed in a 3.5-inch cartridge which had been fitted inside with a liner. Necessary mechanical parts were attached to the cartridge to obtain a 3.5-inch floppy disk. The results of the evaluation of the thus-obtained floppy disks are shown in Tables 1 and 2, wherein (ex.) indicates Example and (comp.) indicates Comparative Example.

TABLE 1

(Example 1)

| Sample No. | Lubricant Kind | Total number of carbon atoms | Amount in upper layer (parts) | Amount in lower layer (parts) | ΔR (%) | Thickness of lower layer (μm) | Reproduced output | Running durability (×10$^4$ passes) | Liner wear |
|---|---|---|---|---|---|---|---|---|---|
| 1 (comp.) | none | — | — | — | — | 2 | 100 | 50 | xx |
| 2 (comp.) | dioleyl carbonate | 37 | 4 | 0 | 0 | 2 | 103 | 760 | x |
| 3 (comp.) | dioleyl carbonate | 37 | 4 | 0.4 | 1.4 | 2 | 105 | 1260 | Δ |
| 4 (ex.) | dioleyl carbonate | 37 | 4 | 0.5 | 1.8 | 2 | 106 | 1640 | o |
| 5 (ex.) | dioleyl carbonate | 37 | 4 | 1 | 3.6 | 2 | 106 | 1730 | o |
| 6 (ex.) | dioleyl carbonate | 37 | 4 | 2 | 7.1 | 2 | 107 | 1800 or more | o |
| 7 (ex.) | dioleyl carbonate | 37 | 4 | 4 | 14.3 | 2 | 107 | 1800 or more | o |
| 8 (ex.) | dioleyl carbonate | 37 | 4 | 8 | 28.6 | 2 | 107 | 1800 or more | o |
| 9 (ex.) | dioleyl carbonate | 37 | 4 | 12 | 42.9 | 2 | 107 | 1800 or more | o |
| 10 (ex.) | dioleyl carbonate | 37 | 4 | 18 | 64.3 | 2 | 107 | 1760 | o |
| 11 (ex.) | dioleyl carbonate | 37 | 4 | 24 | 85.7 | 2 | 107 | 1650 | o |
| 12 (ex.) | dioleyl carbonate | 37 | 4 | 28 | 100.0 | 2 | 106 | 1610 | o |
| 13 (comp.) | dioleyl carbonate | 37 | 4 | 29 | 103.6 | 2 | 105 | 1280 | Δ |
| 14 (comp.) | dioleyl carbonate | 37 | 4 | 8 | 28.6 | 0.5 | 100 | 1050 | Δ |
| 15 (ex.) | dioleyl carbonate | 37 | 4 | 8 | 28.6 | 1 | 105 | 1630 | o |
| 16 (ex.) | dioleyl carbonate | 37 | 4 | 8 | 28.6 | 3 | 107 | 1800 or more | o |
| 17 (ex.) | dioleyl carbonate | 37 | 4 | 8 | 28.6 | 4 | 107 | 1800 or more | o |

TABLE 2

(Example 1, continued)

| Sample No. | Lubricant Kind | Total number of carbon atoms | Amount in upper layer (parts) | Amount in lower layer (parts) | ΔR (%) | Thickness of lower layer (μm) | Reproduced output | Running durability (×10$^4$ passes) | Liner wear |
|---|---|---|---|---|---|---|---|---|---|
| 18 (ex.) | dioleyl carbonate | 37 | 4 | 8 | 28.6 | 5 | 106 | 1680 | o |
| 19 (comp.) | dioleyl carbonate | 37 | 4 | 8 | 28.6 | 6 | 104 | 1180 | Δ |
| 20 (comp.) | lauroleyl ethyl carbonate | 15 | 4 | 4 | 14.3 | 2 | 103 | 1110 | Δ |
| 21 (ex.) | lauroleyl ethyl carbonate | 17 | 4 | 4 | 14.3 | 2 | 105 | 1520 | o |
| 22 (ex.) | oleyl butyl carbonate | 23 | 4 | 4 | 14.3 | 2 | 105 | 1540 | o |
| 23 (ex.) | oleyl isostearyl carbonate | 37 | 4 | 4 | 14.3 | 2 | 106 | 1680 | o |
| 24 (ex.) | oleyl behenyl carbonate | 41 | 4 | 4 | 14.3 | 2 | 104 | 1630 | o |
| 25 (ex.) | dierucyl carbonate | 45 | 4 | 4 | 14.3 | 2 | 104 | 1730 | o |
| 26 (ex.) | didodecenyl carbonate | 25 | 4 | 4 | 14.3 | 2 | 105 | 1740 | o |
| 27 (ex.) | dimyristolenyl carbonate | 29 | 4 | 4 | 14.3 | 2 | 106 | 1760 | o |
| 28 (ex.) | dipalmitoleyl carbonate | 33 | 4 | 4 | 14.3 | 2 | 106 | 1780 | o |

TABLE 2-continued (Example 1, continued)

| Sample No. | Lubricant Kind | Total number of carbon atoms | Amount in upper layer (parts) | Amount in lower layer (parts) | ΔR (%) | Thickness of lower layer (μm) | Reproduced output | Running durability (×10⁴ passes) | Liner wear |
|---|---|---|---|---|---|---|---|---|---|
| 29 (ex.) | dielaidyl carbonate | 37 | 4 | 4 | 14.3 | 2 | 107 | 1800 or more | ○ |
| 30 (ex.) | dilinoleyl carbonate | 37 | 4 | 4 | 14.3 | 2 | 107 | 1800 or more | ○ |
| 31 (ex.) | dilinoleyl carbonate | 37 | 4 | 4 | 14.3 | 2 | 107 | 1800 or more | ○ |
| 32 (ex.) | oleyl elaidyl carbonate | 37 | 4 | 4 | 14.3 | 2 | 107 | 1800 or more | ○ |
| 33 (comp.) | butyl stearate | 22 | 4 | 4 | 14.3 | 2 | 100 | 920 | x |
| 34 (comp.) | oleyl oleate | 36 | 4 | 4 | 14.3 | 2 | 103 | 1210 | Δ |
| 35 (comp.) | dodecyl carbonate | 25 | 4 | 4 | 14.3 | 2 | 100 | 1020 | Δ |

Tables 1 and 2 show that Sample 1 (Comparative Example), in which neither the lower layer nor the upper layer contained a lubricant, Sample 2 (Comparative Example), in which the lower layer did not contain a lubricant, Sample 3 (Comparative Example), in which the proportion of the lubricant to the binder in the lower layer was below 1.8% by weight, Sample 13 (Comparative Example), in which the proportion of the lubricant to the binder (ΔR) in the lower layer was higher than 100% by weight, Sample 14 (Comparative Example), in which the lower layer had a thickness of 0.5 μm, smaller than 1 μm, Sample 19 (Comparative Example), in which the lower layer had a thickness of 6 μm, larger than 5 μm, Sample 20 (Comparative Example), in which the total number of carbon atoms contained in the lubricant was 15, smaller than 17, and Samples 33 to 35 (Comparative Examples), in which the lubricant had from 17 to 45 carbon atoms in total but did not have a carbonate structure, were inferior in each of running durability and liner wear to the samples of the present invention, i.e., the samples in which the upper layer had a thickness of from 0.05 to less than 1.0 μm, the lower layer had a thickness of from 1 to 5 μm, the lubricant used was the compound of the present invention having from 17 to 45 carbon atoms in total, and the proportion of the lubricant to the binder in the lower layer was from 1.8 to 100% by weight.

Example 2

Floppy disks were produced in the same manner as in Example 1, except that the following magnetic layer was used in place of the lower layer in Example 1 under the various conditions shown in Table 3. The results obtained are shown in Table 3.

| LOWER LAYER (Magnetic Layer) | |
|---|---|
| Co-γ-FeO$_x$ (x = 1.45; major axis length, 0.25 μm; H$_c$, 850 Oe; B$_r$, 1,400 G; specific surface area, 70 m²/g) | 100 parts |
| Vinyl chloride copolymer (—SO$_3$Na content, 1 × 10⁻⁴ eq/g) | 13 parts |
| Polyester polyurethane resin (neopentyl glycol/caprolactonepolyol/MDI = 0.9/2.6/1; containing 1 × 10⁻⁴ eq/g —SO$_3$Na group) | 5 parts |
| α-Alumina (particle size, 0.3 μm) | 2 parts |
| Carbon black (average particle size, 0.10 μm) | 0.5 parts |
| Lubricant shown in Table 3 | amount shown in Table 3 |
| Stearic acid | 5 parts |
| Oleic acid | 2 parts |
| Methyl ethyl ketone | 200 parts |

TABLE 3

(Example 2)

| Sample No. | Lubricant Kind | Total number of carbon atoms | Amount in upper layer (parts) | Amount in lower layer (parts) | ΔR (%) | Thickness of lower layer (μm) | Reproduced output (%) | Running durability (×10⁴ passes) | Liner wear |
|---|---|---|---|---|---|---|---|---|---|
| 36 (comp.) | dioleyl carbonate | 37 | 4 | 0.4 | 1.4 | 2 | 94 | 1180 | Δ |
| 37 (ex.) | dioleyl carbonate | 37 | 4 | 0.5 | 1.8 | 2 | 97 | 1540 | ○ |
| 38 (ex.) | dioleyl carbonate | 37 | 4 | 1 | 3.6 | 2 | 98 | 1630 | ○ |
| 39 (ex.) | dioleyl carbonate | 37 | 4 | 2 | 7.1 | 2 | 99 | 1740 | ○ |
| 40 (ex.) | dioleyl carbonate | 37 | 4 | 4 | 14.3 | 2 | 98 | 1770 | ○ |
| 41 (ex.) | dioleyl carbonate | 37 | 4 | 8 | 28.6 | 2 | 99 | 1750 | ○ |
| 42 (ex.) | dioleyl carbonate | 37 | 4 | 18 | 64.3 | 2 | 98 | 1640 | ○ |
| 43 (ex.) | dioleyl carbonate | 37 | 4 | 28 | 100.0 | 2 | 97 | 1570 | ○ |
| 44 (comp.) | dioleyl carbonate | 37 | 4 | 29 | 103.6 | 2 | 95 | 1110 | Δ |
| 45 (comp.) | dioleyl carbonate | 37 | 4 | 8 | 28.6 | 0.5 | 93 | 1010 | Δ |
| 46 (ex.) | dioleyl carbonate | 37 | 4 | 8 | 28.6 | 1 | 96 | 1590 | ○ |
| 47 (ex.) | dioleyl carbonate | 37 | 4 | 8 | 28.6 | 3 | 99 | 1740 | ○ |

TABLE 3-continued (Example 2)

| Sample No. | Lubricant Kind | Total number of carbon atoms | Amount in upper layer (parts) | Amount in lower layer (parts) | ΔR (%) | Thickness of lower layer (μm) | Reproduced output (%) | Running durability (×10⁴ passes) | Liner wear |
| --- | --- | --- | --- | --- | --- | --- | --- | --- | --- |
| 48 (ex.) | dioleyl carbonate | 37 | 4 | 8 | 28.6 | 4 | 99 | 1720 | ○ |
| 49 (ex.) | dioleyl carbonate | 37 | 4 | 8 | 28.6 | 5 | 96 | 1610 | ○ |
| 50 (comp.) | dioleyl carbonate | 37 | 4 | 8 | 28.6 | 6 | 92 | 1120 | Δ |
| 51 (comp.) | lauroleyl ethyl carbonate | 15 | 4 | 4 | 14.3 | 2 | 93 | 1010 | Δ |
| 52 (ex.) | lauroleyl ethyl carbonate | 17 | 4 | 4 | 14.3 | 2 | 94 | 1480 | ○ |
| 53 (ex.) | dierucyl carbonate | 45 | 4 | 4 | 14.3 | 2 | 98 | 1620 | ○ |
| 54 (ex.) | didodecenyl carbonate | 25 | 4 | 4 | 14.3 | 2 | 96 | 1610 | ○ |
| 55 (ex.) | dimyristoleyl carbonate | 29 | 4 | 4 | 14.3 | 2 | 97 | 1640 | ○ |
| 56 (ex.) | dipalmitoleyl carbonate | 33 | 4 | 4 | 14.3 | 2 | 98 | 1660 | ○ |

The results show that the Comparative Examples were inferior to the Examples of this invention in running durability and liner wear, as in Example 1.

Example 3 (Comparative)

The same coating fluid for forming an upper layer as in Example 1 was prepared through dispersion in the same manner as in Example 1, and applied, without a lower layer, at such a thickness as to give a 0.5 μm-thick dry magnetic layer. Thereafter, the same procedure as in Example 1 was carried out to form a single-layer magnetic layer under the conditions shown in Table 4.

Example 4

Floppy disks were produced under the conditions shown in Table 4 in the same manner as in Example 1, except that in forming the lower layer, the amount of the $TiO_2$ used as nonmagnetic particles was changed to 60 parts and the amount of carbon black was changed to 40 parts.

Example 5

Floppy disks were produced under the conditions shown in Table 5 in the same manner as in Example 1, except that in forming the lower layer, the amount of the $TiO_2$ used as nonmagnetic particles was changed to 50 parts and the amount of carbon black was changed to 50 parts. In the floppy disks thus obtained, 50% by weight of the nonmagnetic particles contained in the lower layer had a specific surface area of from 1 to 150 $m^2/g$.

TABLE 4

(Examples 3 and 4)

| Sample No. | Lubricant Kind | Total number of carbon atoms | Amount in upper layer (parts) | Amount in lower layer (parts) | ΔR (%) | Thickness of lower layer (μm) | Reproduced output (%) | Running durability (×10⁴ passes) | Liner wear |
| --- | --- | --- | --- | --- | --- | --- | --- | --- | --- |
| 57 (comp.) | dioleyl carbonate | 37 | 4 | 0 | — | — | 85 | 1100 | x |
| 58 (comp.) | lauroleyl butyl carbonate | 17 | 4 | 0 | — | — | 88 | 850 | x |
| 58 (comp.) | dierucyl carbonate | 45 | 4 | 0 | — | — | 87 | 1020 | x |
| 60 (comp.) | dimyristoleyl carbonate | 29 | 4 | 0 | — | — | 86 | 980 | x |
| 61 (ex.) | dioleyl carbonate | 37 | 4 | 4 | 14.3 | 2 | 99 | 1670 | ○ |
| 62 (ex.) | lauroleyl butyl carbonate | 17 | 4 | 4 | 14.3 | 2 | 95 | 1360 | ○ |
| 63 (ex.) | dierucyl carbonate | 45 | 4 | 4 | 14.3 | 2 | 98 | 1510 | ○ |
| 64 (ex.) | didodecenyl carbonate | 25 | 4 | 4 | 14.3 | 2 | 97 | 1500 | ○ |
| 65 (ex.) | dipalmitoleyl carbonate | 33 | 4 | 4 | 14.3 | 2 | 99 | 1570 | ○ |
| 66 (comp.) | dioleyl carbonate | 37 | 4 | 4 | 14.3 | 0.5 | 92 | 980 | x |
| 67 (ex.) | dioleyl carbonate | 37 | 4 | 4 | 14.3 | 1 | 95 | 1480 | ○ |
| 68 (ex.) | dioleyl carbonate | 37 | 4 | 4 | 14.3 | 3 | 99 | 1660 | ○ |
| 69 (ex.) | dioleyl carbonate | 37 | 4 | 4 | 14.3 | 4 | 99 | 1650 | ○ |
| 70 (ex.) | dioleyl carbonate | 37 | 4 | 4 | 14.3 | 5 | 96 | 1590 | ○ |
| 71 (comp.) | dioleyl carbonate | 37 | 4 | 4 | 14.3 | 6 | 93 | 1050 | Δ |

Table 4 shows that the Comparative Examples were inferior to the Examples of this invention in running durability and liner wear, as in Example 1.

TABLE 5

(Examples 5 and 6)

| Sample No. | Lubricant Kind | Total number of carbon atoms | Amount in upper layer (parts) | Amount in lower layer (parts) | ΔR (%) | Thickness of lower layer (μm) | Reproduced output (%) | Running durability (×10⁴ passes) | Liner wear |
|---|---|---|---|---|---|---|---|---|---|
| 72 (comp.) | dioleyl carbonate | 37 | 4 | 4 | 14.3 | 2 | 87 | 1110 | Δ |
| 73 (comp.) | lauroleyl butyl carbonate | 17 | 4 | 4 | 14.3 | 2 | 86 | 920 | x |
| 74 (comp.) | dierucyl carbonate | 45 | 4 | 4 | 14.3 | 2 | 88 | 1040 | Δ |
| 75 (comp.) | didodecenyl carbonate | 25 | 4 | 4 | 14.3 | 2 | 87 | 1010 | x |
| 76 (comp.) | dipalmitoleyl carbonate | 33 | 4 | 4 | 14.3 | 2 | 86 | 1060 | Δ |
| 77 (ex.) | dioleyl carbonate | 37 | 4 | 4 | 14.3 | 2 | 98 | 1620 | o |
| 78 (ex.) | lauroleyl butyl carbonate | 17 | 4 | 4 | 14.3 | 2 | 94 | 1320 | o |
| 79 (ex.) | dierucyl carbonate | 45 | 4 | 4 | 14.3 | 2 | 97 | 1470 | o |
| 80 (ex.) | didodecenyl carbonate | 25 | 4 | 4 | 14.3 | 2 | 97 | 1450 | o |
| 81 (ex.) | dipalmitoleyl carbonate | 33 | 4 | 4 | 14.3 | 2 | 98 | 1530 | o |
| 82 (comp.) | dioleyl carbonate | 37 | 4 | 4 | 14.3 | 0.5 | 91 | 920 | x |
| 83 (ex.) | dioleyl carbonate | 37 | 4 | 4 | 14.3 | 1 | 94 | 1420 | o |
| 84 (ex.) | dioleyl carbonate | 37 | 4 | 4 | 14.3 | 3 | 99 | 1630 | o |
| 85 (ex.) | dioleyl carbonate | 37 | 4 | 4 | 14.3 | 4 | 99 | 1620 | o |
| 86 (ex.) | dioleyl carbonate | 37 | 4 | 4 | 14.3 | 5 | 96 | 1520 | o |
| 87 (comp.) | dioleyl carbonate | 37 | 4 | 4 | 14.3 | 6 | 92 | 1010 | Δ |

Example 6

Floppy disks were produced under the conditions shown in Table 6 in the same manner as in Example 1, except that the following nonmagnetic layer was used in place of the lower layer in Example 1.

| LOWER LAYER (Nonmagnetic Layer) | |
|---|---|
| Nonmagnetic particles; $SiO_2$ (manufactured by Cabot Corp.; average particle diameter, 0.2 μm; BET specific surface area, 150 m²/g) | 90 parts |
| Carbon black (Ketjen Black EC, manufactured by Lion Akzo Co., Ltd.; average particle diameter, 30 mμ; DBP absorption, 350 ml/100 g; BET specific surface area, 950 m²/g) | 10 parts |
| Vinyl chloride-vinyl acetate-vinyl alcohol copolymer (containing $5 \times 10^{-6}$ eq/g the polar group $-N(CH_3)_3^+Cl^-$; comonomer proportion, 86/13/1; degree of polymerization, 400) | 13 parts |
| Polyester polyurethane resin (neopentyl glycol/caprolactonepolyol/MDI = 0.9/2.6/1; containing $1 \times 10^{-4}$ eq/g $-SO_3Na$ group) | 5 parts |
| Lubricant shown in Table 6 | amount shown in Table 6 |
| Oleic acid | 5 parts |
| Stearic acid | 2 parts |
| Methyl ethyl ketone | 200 parts |

Example 7

Floppy disks were produced under the conditions shown in Table 6 in the same manner as in Example 1, except that the following nonmagnetic layer was used in place of the lower layer in Example 1.

| LOWER LAYER (Nonmagnetic Layer) | |
|---|---|
| Nonmagnetic particles; $SiO_2$ (manufactured by Cabot Corp.; average particle diameter, 0.18 μm; BET specific surface area, 200 m²/g) | 90 parts |
| Carbon black (Ketjen Black EC, manufactured by Lion Akzo Co., Ltd.; average particle diameter, 30 mμ; DBP absorption, 350 ml/100 g; BET specific surface area, 950 m²/g) | 10 parts |
| Vinyl chloride-vinyl acetate-vinyl alcohol copolymer (containing $5 \times 10^{-6}$ eq/g the polar group $-N(CH_3)_3^+Cl^-$; comonomer proportion, 86/13/1; degree of polymerization, 400) | 13 parts |
| Polyester polyurethane resin (neopentyl glycol/caprolactonepolyol/MDI = 0.9/2.6/1; containing $1 \times 10^{-4}$ eq/g $-SO_3Na$ group) | 5 parts |
| Lubricant shown in Table 6 | amount shown in Table 6 |
| Oleic acid | 5 parts |
| Stearic acid | 2 parts |
| Methyl ethyl ketone | 200 parts |

TABLE 6

(Example 7)

| Sample No. | Lubricant Kind | Total number of carbon atoms | Amount in upper layer (parts) | Amount in lower layer (parts) | ΔR (%) | Thickness of lower layer (μm) | Reproduced output (%) | Running durability (×10⁴ passes) | Liner wear |
|---|---|---|---|---|---|---|---|---|---|
| 88 (ex.) | dioleyl carbonate | 37 | 4 | 4 | 14.3 | 2 | 96 | 1520 | o |
| 89 (ex.) | lauroleyl butyl carbonate | 17 | 4 | 4 | 14.3 | 2 | 91 | 1300 | o |

TABLE 6-continued (Example 7)

| Sample No. | Lubricant | | | | ΔR (%) | Thickness of lower layer (μm) | Reproduced output (%) | Running durability (×10⁴ passes) | Liner wear |
|---|---|---|---|---|---|---|---|---|---|
| | Kind | Total number of carbon atoms | Amount in upper layer (parts) | Amount in lower layer (parts) | | | | | |
| 90 (ex.) | dierucyl carbonate | 45 | 4 | 4 | 14.3 | 2 | 95 | 1370 | o |
| 91 (ex.) | didodecenyl carbonate | 25 | 4 | 4 | 14.3 | 2 | 94 | 1340 | o |
| 92 (ex.) | dipalmitoleyl carbonate | 33 | 4 | 4 | 14.3 | 2 | 93 | 1420 | o |
| 93 (comp.) | dioleyl carbonate | 37 | 4 | 4 | 14.3 | 0.5 | 88 | 720 | x |
| 94 (ex.) | dioleyl carbonate | 37 | 4 | 4 | 14.3 | 1 | 92 | 1310 | o |
| 95 (ex.) | dioleyl carbonate | 37 | 4 | 4 | 14.3 | 3 | 96 | 1530 | o |
| 96 (ex.) | dioleyl carbonate | 37 | 4 | 4 | 14.3 | 4 | 96 | 1530 | o |
| 97 (ex.) | dioleyl carbonate | 37 | 4 | 4 | 14.3 | 5 | 95 | 1400 | o |
| 98 (comp.) | dioleyl carbonate | 37 | 4 | 4 | 14.3 | 6 | 89 | 820 | x |

Table 6 shows that the Comparative Examples were inferior to the Examples of this invention in running durability and liner wear, as in Example 1.

In the magnetic recording medium of the present invention, which comprises a nonmagnetic support, an upper layer which is a magnetic layer formed thereon and consisting mainly of ferromagnetic particles and a binder resin, and a lower layer which is disposed between the upper layer and the nonmagnetic support and adjacent to the upper layer and is either a magnetic layer consisting mainly of ferromagnetic particles and a binder resin or a nonmagnetic layer consisting mainly of nonmagnetic particles and a binder, the migration of a lubricant to the upper-layer surface is controlled satisfactorily by regulating the thickness of the magnetic layer as the upper layer to from 0.05 to less than 1.0 μm, and the thickness of the lower layer to from 1 to 5 μm and by incorporating into the lower layer an unsaturated alkyl carbonate of a specific structure having from 17 to 45 carbon atoms in total as the lubricant in an amount of from 1.8 to 100% by weight based on the amount of the binder resin. Thus, a high-density magnetic recording medium which combines sufficient running properties, suitability for running repetitions, and durability and has an exceedingly smooth surface can be provided by the present invention. It is also possible according to the invention to provide a magnetic recording medium having such high lubricity that it withstands not only use and storage in a wide range of atmospheres but also use in a dusty place.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having on at least one side thereof a lower layer and an upper layer, in which the upper layer is a magnetic layer mainly comprising ferromagnetic particles and a binder resin, and the lower layer is adjacent to the magnetic layer and is either a magnetic layer mainly comprising ferromagnetic particles and a binder resin or a nonmagnetic layer mainly comprising nonmagnetic particles and a binder resin, wherein the upper layer has a thickness of from 0.05 to less than 1.0 μm;

the lower layer has a thickness of from 1 to 5 μm and contains unsaturated alkyl carbonate having from 17 to 45 total carbon atoms represented by the following formula in an amount of from 1.8 to 100% by weight based on the amount of the binder resin:

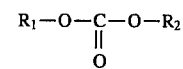

wherein $R_1$ and $R_2$ are the same or different and each represents a chain hydrocarbon group having from 8 to 22 carbon atoms, provided that at least one of $R_1$ and $R_2$ contains one or more unsaturated bonds; and 60 to 100% by weight of the ferromagnetic particles and nonmagnetic particles contained in the lower layer, in the case where the lower layer is a magnetic layer, has a specific surface area of from 1 to 150 m²/g; or 60 to 100% by weight of the nonmagnetic particles contained in the lower layer, in the case where the lower layer is a nonmagnetic layer, has a specific surface area of from 1 to 150 m²/g.

2. The magnetic recording medium as claimed in claim 1, wherein the upper layer contains a lubricant and the amount of the lubricant in the upper layer is from ⅛ to 7 times that in the lower layer.

3. The magnetic recording medium as claimed in claim 1, wherein the ferromagnetic particles are ferromagnetic metal particles having a specific surface area of from 30 to 80 m²/g and a crystallite size of from 80 to 300 Å.

* * * * *